United States Patent

Abelsson et al.

[19]

[11] Patent Number: 5,918,683
[45] Date of Patent: Jul. 6, 1999

[54] HEIGHT ADJUSTMENT FOR LAWN EDGE TRIMMER

[75] Inventors: Lars Åke Abelsson; Mikael Andreasson; Göte Karlsson, all of Huskvarna, Sweden

[73] Assignee: Aktiebolaget Electrolux, Stockholm, Sweden

[21] Appl. No.: 08/863,504

[22] Filed: Jun. 2, 1997

[30] Foreign Application Priority Data

Jun. 7, 1996 [SE] Sweden ................................. 9602271

[51] Int. Cl.$^6$ ....................................................... A01D 53/14
[52] U.S. Cl. ................................................. 172/15; 172/17
[58] Field of Search .................... 172/17, 15, 13

[56] References Cited

U.S. PATENT DOCUMENTS 2,001,921  5/1935  Petteys ....................................... 172/17
5,407,012  4/1995  Klöpfer ................................. 172/17 X

FOREIGN PATENT DOCUMENTS 0 628 242 A2  12/1994  European Pat. Off. .
0 628 242 A3  12/1994  European Pat. Off. .

*Primary Examiner*—Christopher J. Novosad
*Attorney, Agent, or Firm*—Pearne, Gordon, McCoy & Granger LLP

[57] ABSTRACT

A lawn edge trimmer having a supporting structure (21) and an edge trimming assembly (10; 10'). The trimming assembly includes a frame (12) supporting a rotatable cutting knife (18), and a rotatable supporting wheel (30; 30') connected to the frame (12). An axis of rotation of the knife is parallel to an axis of rotation of the wheel. The wheel is supported by a lever (32; 32') rotatably attached to the frame, and may be latched relative to the frame (12). The lever (32; 32') is provided with a mudguard (41).

6 Claims, 5 Drawing Sheets

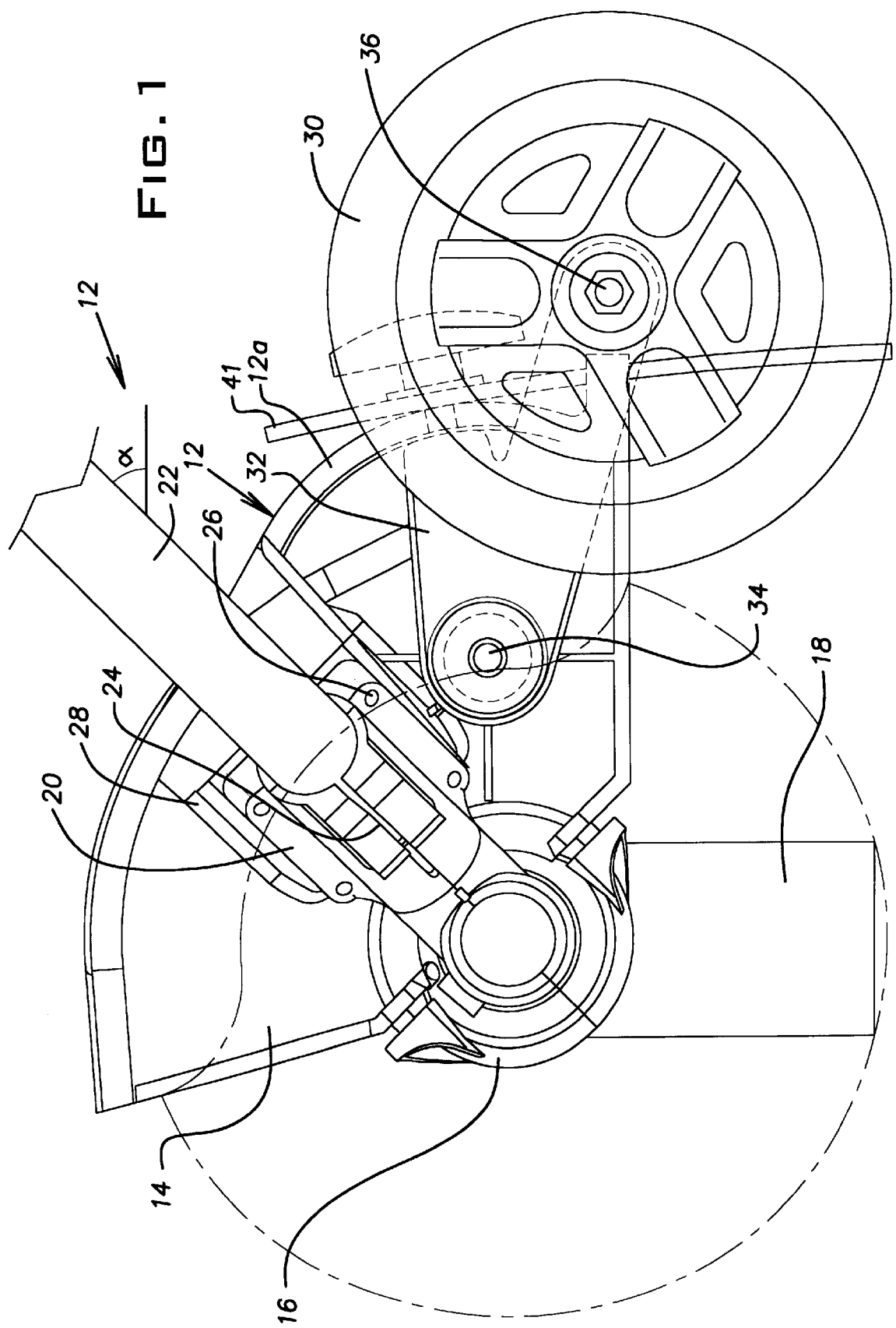

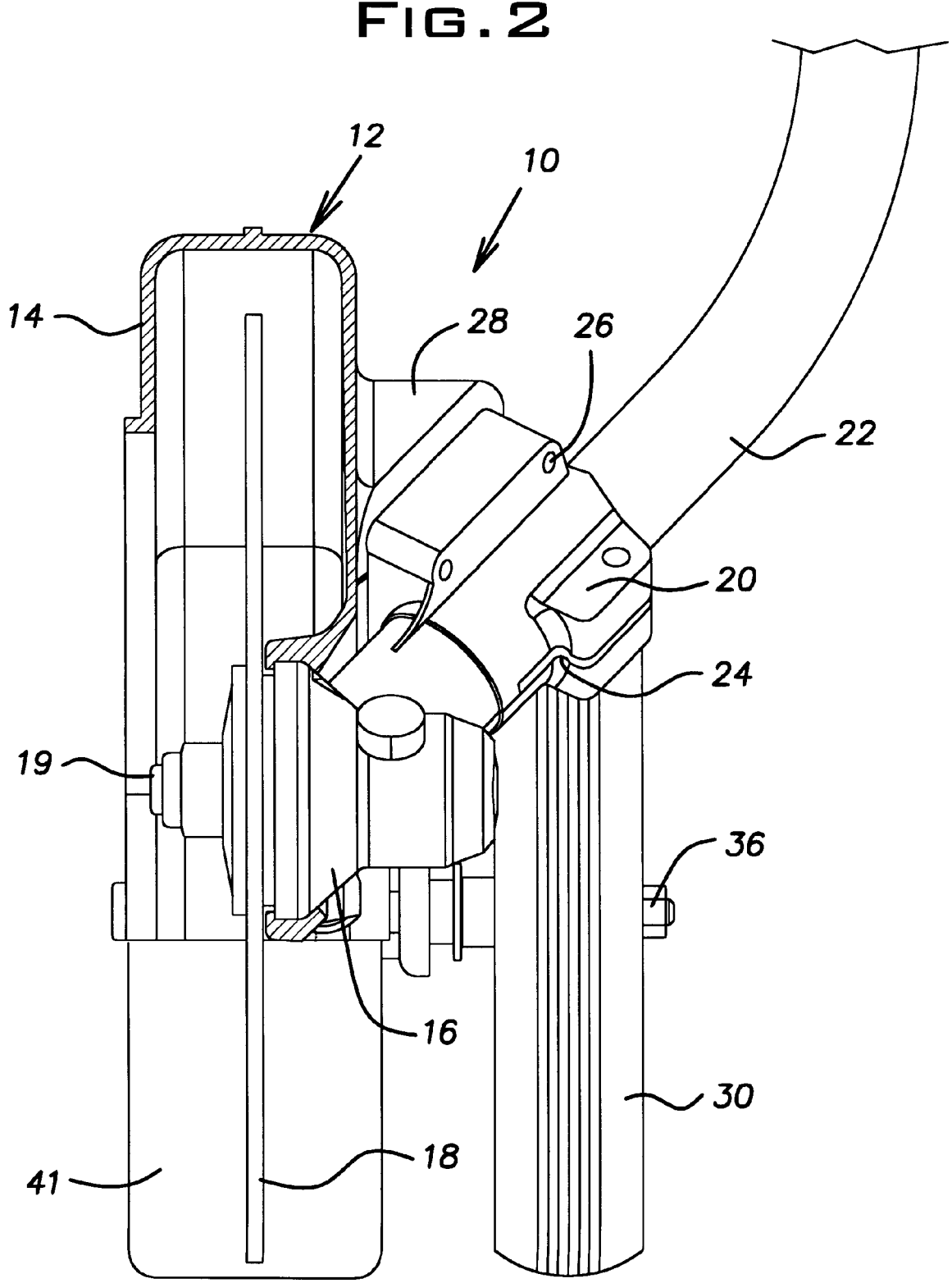

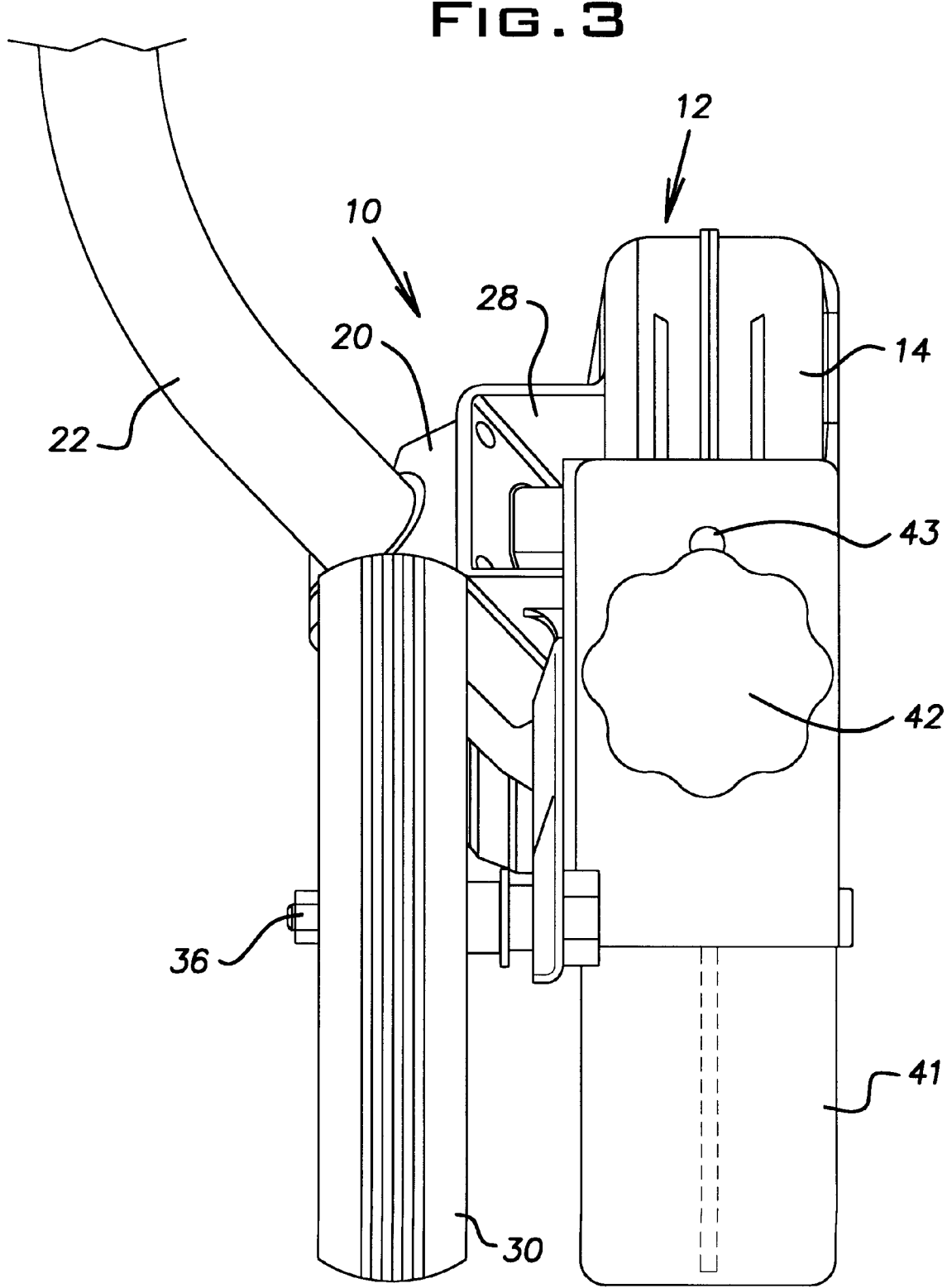

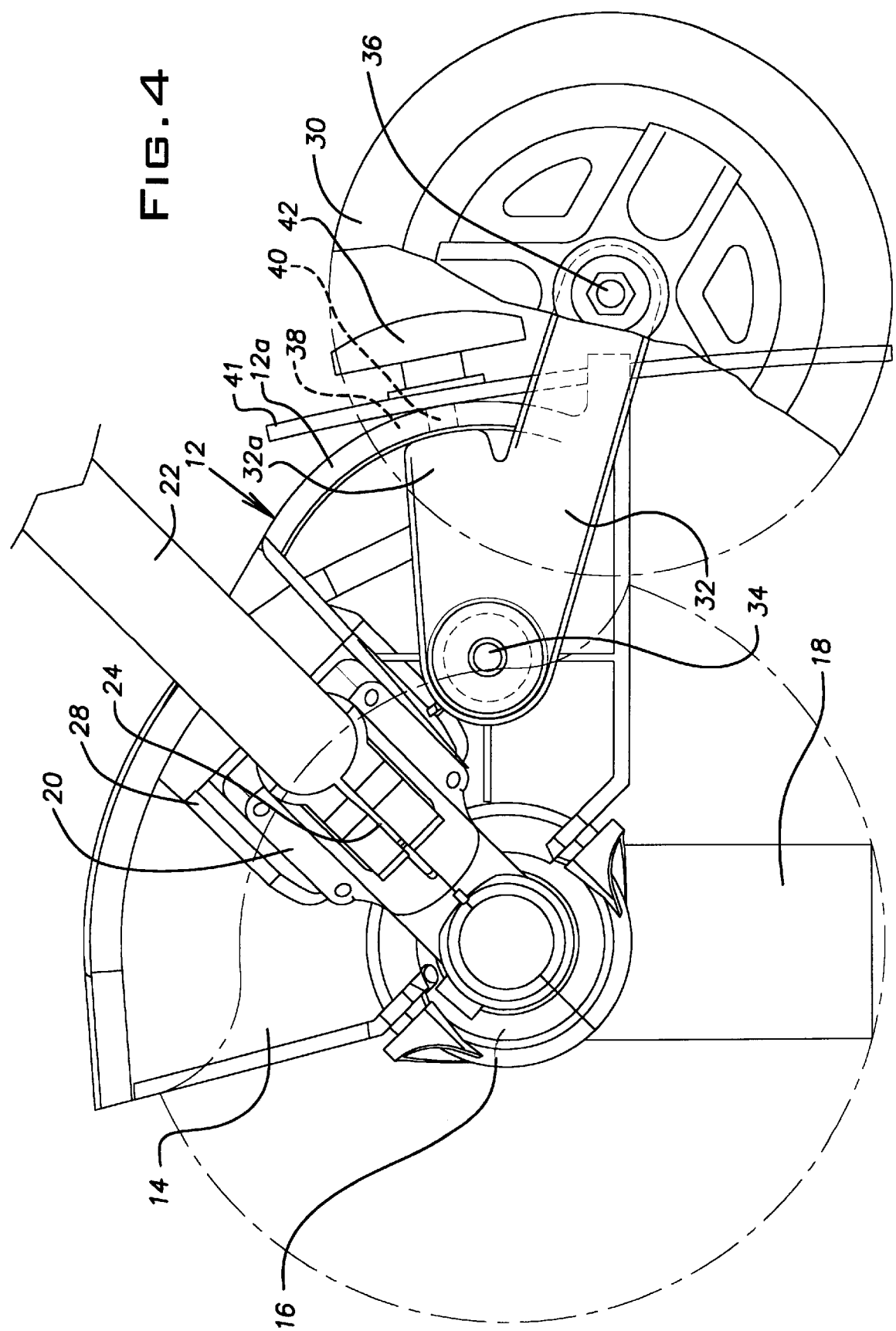

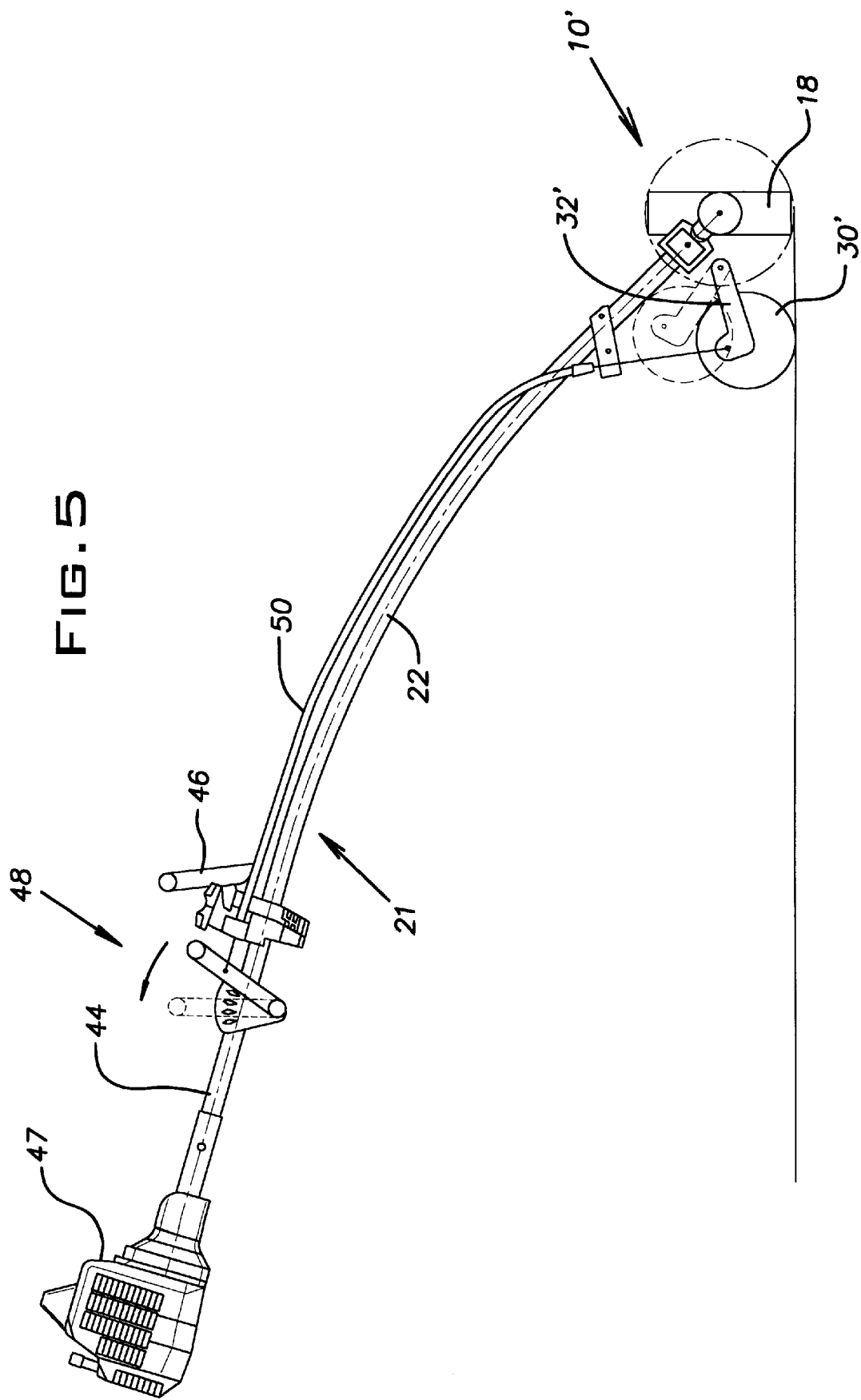

HEIGHT ADJUSTMENT FOR LAWN EDGE TRIMMER

BACKGROUND OF THE INVENTION

The present invention relates to a lawn edge trimmer comprising a supporting structure and an edge trimming assembly having a frame supporting a rotatable cutting knife via a gearbox, a power source for rotating said cutting knife, a rotatable supporting wheel connected to said frame, the axis of rotation of said cutting knife being generally parallel to the axis of rotation of said supporting wheel. The invention also relates to an edge trimming assembly forming part of a lawn edge trimmer.

Lawn edge trimmers are previously known having a supporting wheel rotatably attached to the frame, the adjustment of the cutting depth of the knife being obtained in that the gearbox is rotatable relative to the tool body and that the gearbox and the frame can be fixed in a certain position relative to each other. It has appeared, however, that the fixing means break down and that full cutting depth of the knife cannot be achieved. In addition, the operator's working position is affected when the cutting depth is changed.

SUMMARY OF THE INVENTION

The object of the present invention is to provide a lawn edge trimmer of the kind mentioned in the introduction in which a height adjustment to maximum cutting depth can be achieved. The edge trimmer can also be easily fixed at a certain height adjustment, and the operator's working position is not affected by the height adjustment.

BRIEF DESCRIPTION OF THE DRAWINGS

These and further features of the present invention will be apparent with reference to the following description and drawings, wherein:

FIG. 1 is a side view of an edge trimming assembly of a lawn edge trimmer according to the invention, FIG. 2 is a front view of the assembly shown in FIG. 1, FIG. 3 is a rear view of the assembly shown in FIG. 1, FIG. 4 is a side view according to FIG. 1 in which the supporting wheel has been partially omitted for the purpose of showing the height adjusting device more clearly, and FIG. 5 shows an lawn edge trimmer having an edge trimming assembly according to the present invention.

DETAILED DESCRIPTION OF THE PREFERRED EMBODIMENT

The edge trimming assembly shown in FIGS. 1–3 comprises a frame 12 which is essentially made as a mudguard 14 and in a side view has the general shape of a circle segment. A gearbox 16 is provided in the "circle centre" of the frame 12, said gearbox having a shaft 19 supporting a cutting knife 18 which is rotatable in the plane of the drawing in FIG. 1. The gearbox 16 also has a fastening means 20 adapted to receive the free end of a tube shaft 22. The fastening means 20 comprises a first slot 24 for facilitating the insertion of the tube shaft 22 into the fastening means 20. The first slot 24 enables the portions of the fastening means 20 separated by the slot to be moved slightly towards each other in order to provide satisfactory clamping of the tube shaft 22. The clamping is provided by means of a screw joint.

As can be seen in FIGS. 1–3, the portion of the fastening means 20 receiving the tube shaft 22 is also secured to a portion 28 of the frame 12 by means of bolts 26. The frame portion 28 comprises a wedge-shaped abutment made integral with the frame 12 and the mudguard 14. By attaching the fastening means to the gearbox 16 and to the frame portion abutment an extremely solid attachment of the tube shaft 22 is obtained.

A supporting wheel 30 is rotatably connected to the frame 12 by means of a lever 32 and a hinge 34. The supporting wheel 30 is in turn rotatably supported on the lever 32 by a pivot 36. The rotatable lever 32 can be latched in any optional position within its range of operation. Latching in any position is made possible in that a portion 32a of the lever is connected internally to the frame 12 as, shown best in FIG. 4 wherein part of the supporting wheel 30 has been omitted. The portion 12a of the frame 12 has a bending radius corresponding to the distance from the hinge 34 to the frame portion 12a. This means that the portion 32a of the lever 32 is slidable along the inside of the frame portion 12a.

The frame portion 12a has a second slot 38 extending tangentially along said frame portion. A tapped pin 40 extends from the portion 32a through the second slot and a knob 42 is screwed onto said pin 40. When the knob 42 is unscrewed, the lever 32 can be rotated around the hinge 34 with the pin 40 moving in the second slot 38, and when the knob 42 is tightened the lever 30 is fixed relative to the frame 12.

The pin 40 extending from the portion 32a has a mudguard 41 attached thereto which is made as a flap of flexible material, preferably rubber, said flap extending downwards from the pin 40 and generally to the ground. Due to the fact that the mudguard 41 is attached to the pin 40 it will be entrained with the pin 40 sliding in the slot 38 when the height adjustment of the supporting wheel 30 is changed. It should be mentioned in this connection, however, that a certain wear of the mudguard 41 will take place at the edge thereof engaging the ground. To compensate for such wear, the mudguard 41 is provided with at least one additional attachment hole 43 (FIG. 3), which means that an adjustment of the mudguard 41 is made by using a new attachment hole 43 when the lower edge of the mudguard has been worn to some extent.

FIG. 5 illustrates a lawn edge trimmer provided with an alternative embodiment of an edge trimming assembly 10' according to the present invention. A supporting structure 21 comprises a tube shaft 22 and a handle bar bracket 44 having means for attaching a harness. A control handle 46 is provided between the tube shaft 22 and the handle bar bracket 44. An engine 47 is provided at the free end of the handle bar bracket 44, said engine providing the driving power for rotating the cutting knife 18.

The height adjustment is somewhat modified as compared to the above described embodiment since in the arrangement according to FIG. 5 the height adjustment can be carried out from a control means 48 on the handle bar bracket 44. A wire 50 extends from the control means 48 to the lever 32' of the edge trimming assembly 10'. In this embodiment no latching device is provided in connection with the supporting wheel 30', such latching device being provided in connection with the control means 48, which means that the wire 50 can be latched in a plurality of positions to fix the lever 32, and the supporting wheel 30' at various height positions. It is also within the scope of the invention to use other types of controls provided on the supporting structure 21 for controlling or latching the lever 32' or the supporting wheel 30'.

The edge trimming assembly according to the invention operates in the following manner. With reference particularly to FIGS. 1 and 4, it should be seen that the lever 32 of the supporting wheel 30 is rotated upwards to increase the cutting depth of the assembly 10, and the lever 32 is fixed in its position by tightening the knob 42. By rotating the supporting wheel upwards, the cutting knife 18, when rotated, will sink deeper into the ground. Correspondingly, when the supporting wheel 30 and its lever 32 are rotated downwards around the hinge 34 and latched by tightening the knob 42, the cutting knife 18 will be raised relative to the ground, provided, however, that the angle α of the tube shaft 22 (FIG. 1) relative to a horizontal plane or the plane of the ground is not changed. This is a condition for not changing the working position of the operator, i.e. that the angle of the tube shaft is not changed. It is thus a very essential advantage of the present invention that adjustment of the depth of operation of the cutting knife 18 can take place without changing the angle α of the tube shaft 22 which means that the working position of the operator is not affected.

The function of the edge trimming assembly 10' shown in FIG. 5 generally corresponds to the function of the edge trimming assembly 10 described above, the difference being that adjustment and fixing of the lever 32' is carried out by the control means 48 and the wire 50.

As appears from FIG. 5, the tube shaft 22 has a bend in the plane of the drawing, said bend being concave as seen from the ground, which means that the handle bar bracket 44 is closer to the ground than would have been the case if the tube shaft had been straight in the plane of the drawing. As a result of said bend of the tube shaft 22, an ergonomic design of the edge trimmer of FIG. 5 has been obtained.

As appears from FIGS. 2 and 3, the tube shaft 22 is also bent in a direction perpendicular to the plane of FIG. 5, and due to this last-mentioned bend the tube shaft is displaced sidewise from the edge trimming assembly. This is advantageous to the operator in that he need not be straight behind the cutting knife 18 which might involve the risk of being hit by gravel or the like that might pass the mudguard 41. The double bend of the tube shaft 22 also means that the control handle 46 is placed in a more appropriate position and that the engine 47 will interfere with the right arm of the operator to a lesser extent.

The above described embodiments of the invention relate to lawn edge trimmers in which the edge trimming assembly constitutes a permanent part of the edge trimmer. However, it is possible within the scope of the invention to have the trimming assembly disconnectable, for example by making the supporting structure divisible which makes it possible to attach various types of assemblies to the structure.

We claim:

1. A lawn edge trimmer comprising a supporting structure (21) and an edger trimming assembly (10; 10'), said supporting structure including a power source (47) for rotating a cutting knife (18), said trimming assembly (10; 10') including a frame (12) supporting the rotatable cutting knife (18) via a gearbox (16), a rotatable supporting wheel (30; 30') connected to said frame (12), an axis of rotation (19) of said cutting knife (18) being generally parallel to an axis of rotation (36) of said supporting wheel (30; 30'), said supporting wheel being supported by a lever (32; 32') rotatably attached to said frame (12), and clamping means (38, 40, 42; 48, 50) for latching said supporting wheel (30; 30') and lever in position relative to said frame (12), wherein the lever (32; 32') supporting the supporting wheel (30; 30') is provided with a mudguard (41), said mudguard being part of the clamping means and comprising a flap of flexible material.

2. The lawn edge trimmer according to claim 1, wherein the mudguard (41) has adjustable attaching means for compensating for wear of the mudguard.

3. The lawn edge trimmer according to claim 1, wherein the supporting structure (21) is bent in two mutually perpendicular directions.

4. The lawn edge trimmer according to claim 3, wherein the supporting structure (21) has a concave bend as seen from the ground.

5. An edge trimming assembly (10; 10') adapted to be attached to a supporting structure (21), said assembly comprising a frame (12) supporting a rotatable cutting knife (18) via a gearbox (16), a rotatable supporting wheel (30; 30') connected to said frame (12), on axis of rotation (19) of said cutting knife (18) being generally parallel to an axis of rotation (36) of said supporting wheel (30; 30'), said supporting wheel being supported by a lever (32; 32') rotatably attached to said frame (12), and means (38, 40, 42) for latching said supporting wheel (30; 30') in relation to said frame (12), wherein the lever (32; 32') is attached relative to the frame (12) by clamping means, said clamping means comprising a mudguard (41), said mudguard comprising a flap of flexible material.

6. The edge trimming assembly (10; 10') according to claim 5, wherein the mudguard (41) has adjustable attaching means (43) for compensating for wear of the mudguard.

* * * * *

UNITED STATES PATENT AND TRADEMARK OFFICE
CERTIFICATE OF CORRECTION

PATENT NO. : 5,918,683
DATED      : July 6, 1999
INVENTOR(S) : Abelsson et al.

It is certified that error appears in the above-identified patent and that said Letters Patent is hereby corrected as shown below:

Column 2, Line 13, delete "12 as," and insert --12, as--.

Column 2, Line 60, delete "32," and insert --32'--.

Column 4, Claim 5, Line 33, delete "on" and insert --an--.

Signed and Sealed this

Twenty-first Day of December, 1999

Attest:

Attesting Officer

Q. TODD DICKINSON

Acting Commissioner of Patents and Trademarks